United States Patent
Nagasawa et al.

(10) Patent No.: US 6,906,843 B2
(45) Date of Patent: Jun. 14, 2005

(54) FERRULE ATTACHMENT TYPE OPTICAL ISOLATOR, AND MANUFACTURING METHOD THEREOF

(75) Inventors: Mitsuru Nagasawa, Shizuoka (JP); Hirotaka Kawai, Shizuoka (JP)

(73) Assignee: FDK Corporation, Tokyo (JP)

(*) Notice: Subject to any disclaimer, the term of this patent is extended or adjusted under 35 U.S.C. 154(b) by 0 days.

(21) Appl. No.: 10/994,986

(22) Filed: Nov. 22, 2004

(65) Prior Publication Data

US 2005/0094239 A1 May 5, 2005

Related U.S. Application Data

(63) Continuation of application No. PCT/JP03/06350, filed on May 21, 2003.

(30) Foreign Application Priority Data

May 22, 2002 (JP) ........................................ 2002-147216

(51) Int. Cl.[7] .............................. G02B 6/36; G02B 6/13
(52) U.S. Cl. ....................... 359/280; 359/282; 359/283; 385/11; 385/31; 385/34
(58) Field of Search ................................ 359/280, 282, 359/283, 251; 385/11, 78, 31, 34, 36

(56) References Cited

U.S. PATENT DOCUMENTS 4,926,430 A * 5/1990 Isono ........................... 372/33
5,841,922 A * 11/1998 Iwatsuka et al. .............. 385/76
6,577,779 B2   6/2003 Watanabe et al. ............. 385/11
2001/0012422 A1   8/2001 Watanabe et al. ............. 385/11

FOREIGN PATENT DOCUMENTS

JP     11-167085 A     6/1999

OTHER PUBLICATIONS

International Search Report—PCT/JP03/06350; ISA/JPO; Mailed: Aug. 12, 2003.

* cited by examiner

*Primary Examiner*—Timothy Thompson
(74) *Attorney, Agent, or Firm*—Harness, Dickey & Pierce, P.L.C.

(57) ABSTRACT

An optical isolator comprising a combination of an optical isolator main body and a holder holding the optical isolator main body, the optical isolator main body including a Faraday rotator element, a polarizer and an analyzer disposed at the front and back of the Faraday rotator element, and permanent magnets disposed on the outside of the Faraday rotator element, the polarizer and the analyzer. The optical isolator main body has a pair of the permanent magnets in the shape of elongated flat plates opposed to each other with a space therebetween, and the Faraday rotator element, the polarizer and the analyzer disposed between the pair of permanent magnets, the holder having a concave groove formed on one side of a cylindrical portion having a central through hole, the optical isolator main body being inserted and fastened in the concave groove of the holder with the outer surfaces of the permanent magnets exposed, such that the holder can be attached to a ferrule at the end face on the opposite side of the concave groove.

6 Claims, 2 Drawing Sheets

FERRULE ATTACHMENT TYPE OPTICAL ISOLATOR, AND MANUFACTURING METHOD THEREOF

CROSS-REFERENCE TO RELATED APPLICATIONS

This application is a continuation of the International Application No. PCT/JP03/06350 filed on May 21, 2003 designating the United States of America.

BACKGROUND OF THE INVENTION

1. Field of the Invention

The present invention relates generally to an optical isolator, and more particularly, to a ferrule attachment type optical isolator constructed to have an optical isolator main body inserted and fastened in a concave groove of a holder and which enables the direct attachment of the holder to an end face of a ferrule.

2. Description of the Related Art

As publicly known, the optical isolator is an irreversible optical device that permits the passage of light in one direction but blocks the passage thereof in the opposite direction. The optical isolator is employed, for example, in an optical communication system using a semiconductor laser as a light source, to prevent the laser beam from returning toward the light source as a result of reflection. This type of optical isolator generally has a polarizer, a Faraday rotator element and an analyzer arranged in this order along the optical path, with a permanent magnet, adapted to apply a magnetic field along the optical path to the Faraday rotator element, provided outside the Faraday rotator element. The Faraday rotator element is used to rotate the polarizing surface of the incident light 45 degrees by the magnetic field of the permanent magnet, and the optic axes (polarization transmission axes) of the polarizer and the analyzer are oriented at 45 degrees to each other.

A configuration has been recently proposed that is intended to directly attach the optical isolator to the end face of the optical fiber ferrule in order to further reduce the distance between the light receiving and emitting devices for size reduction. The optical isolator to be attached is configured, for example, so that the polarizer, the Faraday rotator element and the analyzer are inserted and fastened in a cylindrical permanent magnet, or so that the polarizer, the Faraday rotator element and the analyzer are laminated in advance with an adhesive and inserted in a permanent magnet. In any case, the polarizer and the analyzer are of the same specification, and one of the polarizer and the analyzer is rotated relative to the other with the optical axis at the center so that the optic axes thereof are oriented at 45 degrees to each other.

In the case of the configuration having the polarizer, the Faraday rotator element and the analyzer (collectively referred to as optical elements) inserted in a cylindrical permanent magnet while maintaining an optically necessary effective area, the size cannot be readily reduced comparably to the outer diameter of the ferrule. The reason is that the more compact the size becomes, the more difficult it becomes to fasten the optical elements and that the bonding strength weakens due to the reduced bonding area of the optical elements. As for the configuration adapted to laminate the polarizer, the Faraday rotator element and the analyzer in advance with an adhesive, although the assembly work is relatively easy, on the other hand, this configuration is prone to problems such as possible damage in the case of the passage of a high-power light beam due to the mediation of an adhesive in the optical path. Therefore, this configuration is limited in applications (conditions of use). Moreover, both of these configurations require man-hours/parts to adjust the orientation of the optic axes, thus resulting in high cost.

SUMMARY OF THE INVENTION

It is an object of the present invention to provide a ferrule attachment type optical isolator and manufacturing method thereof that allow, without employing laminated construction, the firm and ready fastening of the optical elements and an overall reduction in size and diameter.

In order to achieve the above and other objects, according to an aspect of the present invention there is provided an optical isolator comprising a combination of an optical isolator main body and a holder holding the optical isolator main body, the optical isolator main body including a Faraday rotator element, a polarizer and an analyzer disposed at the front and back of the Faraday rotator element, and permanent magnets disposed on the outside of the Faraday rotator element, the polarizer and the analyzer, wherein the optical isolator main body has a pair of the permanent magnets in the shape of elongated flat plates opposed to each other with a space therebetween, and the Faraday rotator element, the polarizer and the analyzer disposed between the pair of permanent magnets, wherein the holder has a concave groove formed on one side of a cylindrical portion having a central through hole, and wherein the optical isolator main body is inserted and fastened in the concave groove of the holder with the outer surfaces of the permanent magnets exposed such that the holder can be attached to a ferrule at an end face on the opposite side of the concave groove.

According to another aspect of the present invention there is provided an optical isolator manufacturing method comprising:

providing a pair of permanent magnets in the shape of elongated flat plates;

arranging a Faraday rotator element on one of the pair of permanent magnets so as to cut across the longitudinal direction thereof;

arranging a polarizer and an analyzer on the other of the pair of permanent magnets so as to cut across the longitudinal direction thereof with a given space between the polarizer and the analyzer; and securely installing the pair of permanent magnets opposed to each other such that the polarizer, the Faraday rotator element and the analyzer are arranged in this order along the optical axis in the concave groove of a substantially cylindrical holder, the holder having one end portion formed with the concave groove and the other end portion adapted to be attached to a ferrule.

The features and objects other than the above of the present invention will become more apparent from the following detailed description when read in conjunction with the accompanying drawings.

To more fully understand the present invention and the advantages thereof, reference should be made to the following description and the accompanying drawings.

DETAILED DESCRIPTION OF THE INVENTION

At least the following will become apparent from the description herein and the annexed drawings.

Figure 1A:
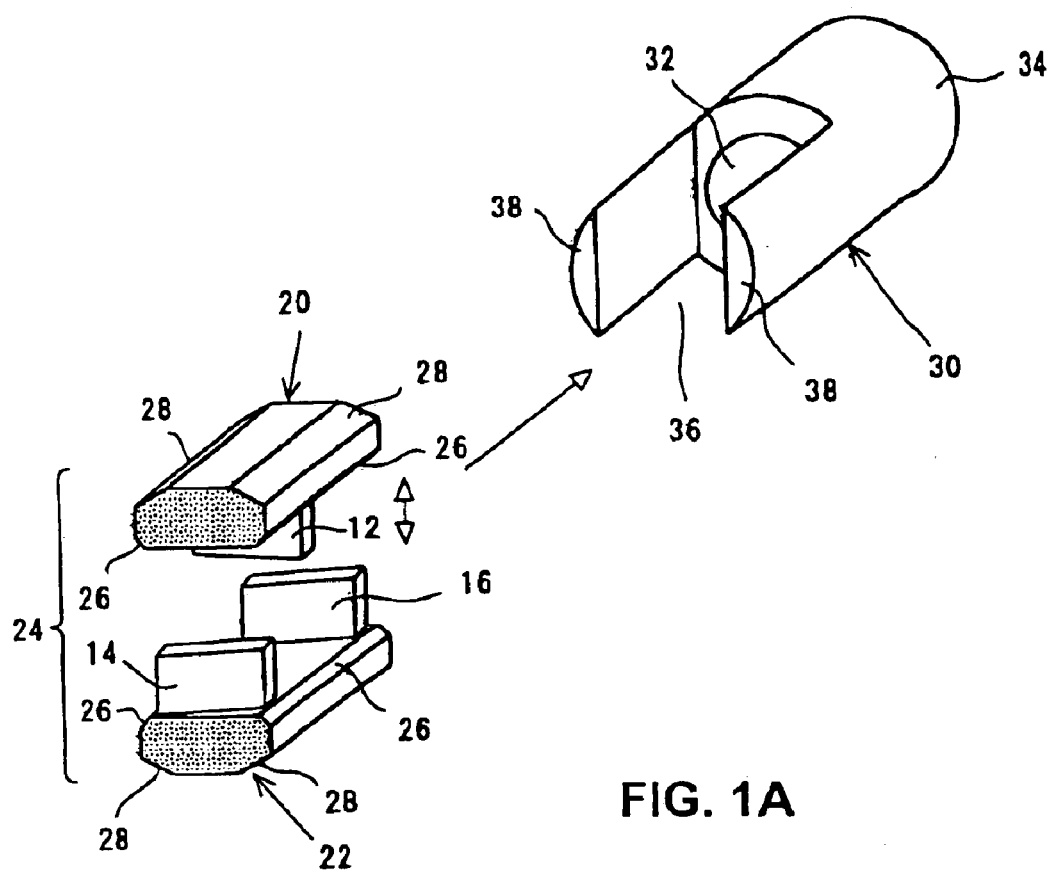
FIGS. 1A and 1B are perspective views showing an embodiment of a ferrule attachment type optical isolator according to the present invention.
Figure 1B:
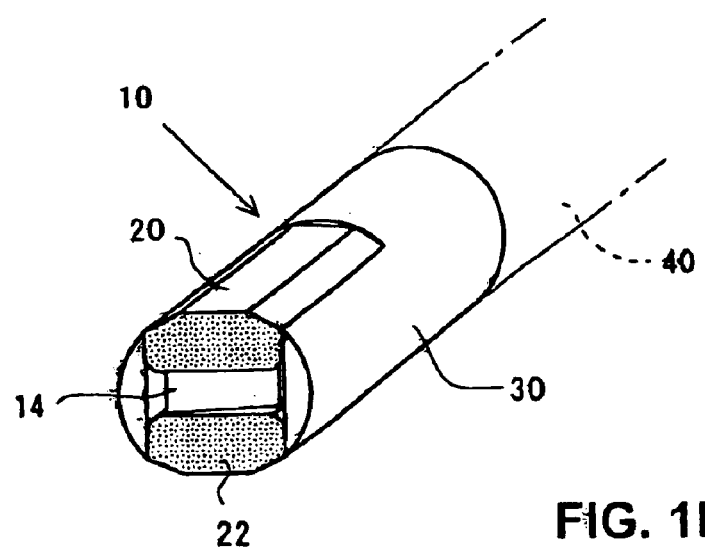
Figure 2A:
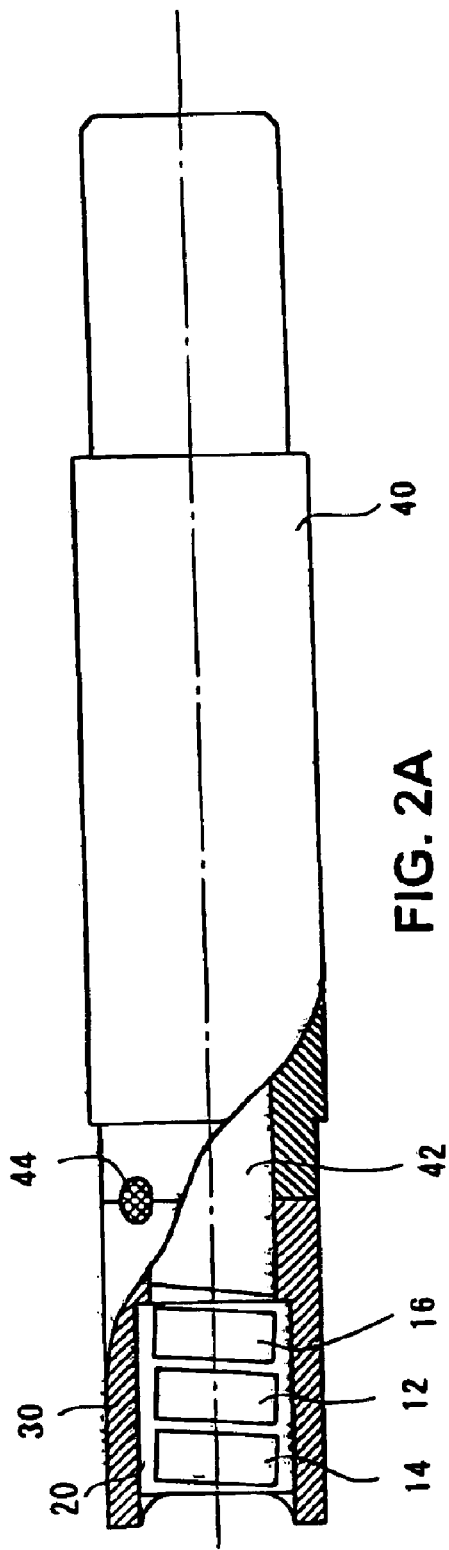
FIGS. 2A and 2B are explanatory views of the ferrule attachment type optical isolator according to the present invention.
Figure 2B:
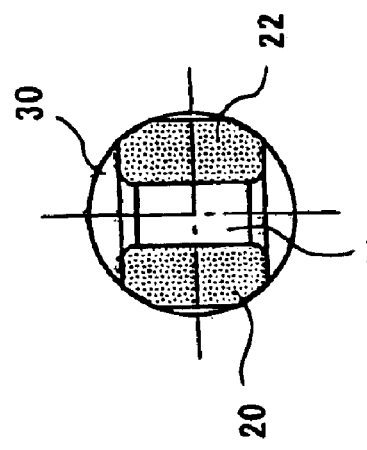

FIGS. 1A and 1B are perspective views showing an embodiment of a ferrule attachment type optical isolator according to the present invention. FIG. 1A shows the isolator as disassembled, and FIG. 1B shows the isolator as assembled. FIGS. 2A and 2B are explanatory views of the ferrule attachment type optical isolator. FIG. 2A is a partially broken side view, and FIG. 2B is a front view. A ferrule attachment type optical isolator 10 is made up of a combination of an optical isolator main body 24 having a Faraday rotator element 12, a polarizer 14 and an analyzer 16 provided at the front and back of the Faraday rotator element 12 and a pair of permanent magnets 20 and 22 provided on the outside of the Faraday rotator element 12, the polarizer 14 and the analyzer 16, and a holder 30 holding the optical isolator main body 24.

The optical isolator main body 24 has the permanent magnets 20 and 22 in the shape of an elongated flat plate arranged opposed to each other with a space therebetween. The polarizer 14, the Faraday rotator element 12 and the analyzer 16 are assembled so as to be sandwiched between the permanent magnets 20 and 22. The polarizer 14 and the analyzer 16 are made, for example, of rutile crystal. The polarizer 14 and the analyzer 16 are equally shaped into the form of a rectangular flat plate so that the optic axes thereof are oriented at 45 degrees to each other. For instance, the optic axis of the polarizer 14 is set in the direction parallel (or vertical) to the longer side of the polarizer 14. In contrast, the optic axis of the analyzer 16 is set in the direction at 45 degrees to the longer side of the analyzer 16. The Faraday rotator element 12 is made of magnetic garnet single crystal (e.g., Bi-substituted rare earth iron garnet single crystal) and shaped into the form of a rectangular flat plate as are the polarizer 14 and the analyzer 16. The thickness of the Faraday rotator element 12 is set so that the incident light having the wavelength used rotates its polarizing surface 45 degrees.

The permanent magnets 20 and 22 are made, for example, of SmCo-based rare earth sintered magnet and magnetized in the longitudinal direction. The width of the permanent magnets 20 and 22 in the shape of an elongated flat plate is set slightly larger than the length of the longer side of the optical elements such as the polarizer. Because of the basically flat shape, the permanent magnets 20 and 22 are easy to shape and inexpensive to manufacture. The Faraday rotator element 12 is surface-bonded to the permanent magnet 20 on the side surface of the longer side, and the polarizer 14 and the analyzer 16 are surface-bonded to the permanent magnet 22 on the side surface of the longer side, with a given space therebetween (space larger than the thickness of the Faraday rotator element 12). Thus, the optical elements are surface-bonded on the side surface of the longer side. This provides an increased bonding area, thus increasing the fastening strength. It is to be noted that the surfaces of the permanent magnets 20 and 22 that are opposed to each other (surfaces to which the optical elements are bonded) are polished in advance with a grinding wheel. It is preferred that the ridgeline portions of the surfaces of the permanent magnets 20 and 22 in the longitudinal direction, to which the optical elements are bonded, be chamfered at least slightly. This makes it possible to use a chamfer 26 to place the adhesive partially on the side surface of the shorter side of the optical elements, thus ensuring an enhanced bonding strength between the permanent magnets and the optical elements.

The permanent magnet 22 bonded to the polarizer 14 and the analyzer 16 is coupled with the permanent magnet 20 bonded to the Faraday rotator element 12 to configure the optical isolator main body 24. Thus, the polarizer 14 and the analyzer 16, whose optic axes are oriented in advance in given directions, are bonded to the same plane of the same permanent magnet 22. This allows the desired isolator characteristic to manifest itself without any adjustment of the optical axis at the time of assembly. Moreover, since the optical elements are individually fastened to one of the permanent magnets, only air layers are present between the optical elements with no bonding layers. As a result, no damage will occur even if a high-power light beam passes.

The holder 30 has a construction such that a concave groove 36 is formed in the direction orthogonal to the central axis on one side of a cylindrical portion 34 having a central through hole 32. In other words, the holder 30 has the cylindrical portion 34 with the central through hole 32 and a pair of holding pieces 38 protruding integrally from one side of the cylindrical portion 34 in the direction of the central axis, with the concave groove 36 formed by the pair of the holding pieces 38. Therefore, the outer circumferential surfaces of the holding pieces 38 are flush with the outer circumferential surface of the cylindrical portion 34. The optical isolator main body 24 is inserted in the concave groove 36 and bonded and fastened thereto.

The permanent magnet 20 bonded to the Faraday rotator element 12 and the permanent magnet 22 bonded to the polarizer 14 and the analyzer 16 are assembled into the concave groove 36 of the holder 30 so that the surfaces of the permanent magnets 20 and 22 bonded to the optical elements are opposed and parallel to each other. The bonding and fastening is ensured by the entire side surfaces (three surfaces) that are in contact with the permanent magnets 20 and 22. A sufficient fastening strength can be secured because of the large bonding area. To proceed with this assembly work, the permanent magnets are preferably separately fitted into the concave groove 36 and bonded thereto. After fitting and bonding of one of the permanent magnets, the other permanent magnet should be fitted and bonded. This causes the polarizer/analyzer pair and the Faraday rotator element to be held respectively by the different permanent magnets only on one side, thus alleviating the thermal stress as a result of temperature changes.

Since the permanent magnets 20 and 22 in the shape of an elongated flat plate are inserted in the concave groove 36, the angles around the optical axis are uniquely determined. To ensure practical alignment with the outer circumferential shape of the holder 34 at the time of the insertion of the permanent magnets 20 and 22 in the concave groove 36, the outer corner portions of the permanent magnets 20 and 22 are shaped into a tilting surface (or rounded off). The tilting surfaces are shown by symbol 28. This prevents the permanent magnets 20 and 22 from protruding excessively from the outer circumferential surface of the holder 30, thus reducing the outer diameter of the optical isolator. Further, since the permanent magnets 20 and 22 are exposed, a further size reduction can be realized. The optical elements are protected by the holding pieces 38 of the holder 30 and the permanent magnets 20 and 22. Moreover, the permanent magnets 20 and 22 and the holder 30 are fastened so that the permanent magnets 20 and 22 are sandwiched by the holding pieces 38 of the holder 30. This ensures enhanced mechanical strength against vibrations and impacts from various directions.

The holder 30 can be attached to a ferrule 40 at the end portion on the opposite side of the concave groove 36. As shown in FIG. 2A, the central through hole 32 of the holder 30 has a shape into which a capillary portion 42 of the ferrule 40 can perfectly fit. With the capillary portion 42 fitted into the central through hole 32, the end faces of the holder and the ferrule are caused to abut each other to be fastened. If both the holder and the ferrule are made of stainless steel, the two are fastened at a plurality of locations along the entire circumference (e.g., eight locations) by YAG welding 44.

The optical elements (the polarizer 14, the Faraday rotator element 12, the analyzer 16) are attached to the permanent magnets 20 and 22 so as to be slightly tilted from the vertical to the optical axis to prevent the end-face reflection. The surfaces of the permanent magnets 20 and 22 bonded to the optical elements are flat, and the optical elements are in the shape of a rectangular flat plate. Therefore, the optical elements are easy to bond in a tilted posture. The end surface of the capillary portion 42 is also polished so as to be slightly tilted (e.g., eight degrees) from the vertical to the optical axis. Such a tilt prevents return light as a result of reflection.

According to the embodiment of the present invention described above, an optical isolator main body has two permanent magnets in the shape of an elongated flat plate opposed to each other with a space therebetween, with a polarizer, a Faraday rotator element and an analyzer sandwiched between the permanent magnets. This ensures firm and easy fastening of the optical elements. Moreover, since the optical elements need not be laminated to each other, faults such as damage due to a high-power light beam are unlikely to occur. Further, a holder has a construction such that a concave groove is formed on one side of a cylindrical portion having a central through hole. Since the optical isolator main body is inserted and fastened in the concave groove, the permanent magnets are exposed. As a result, a further reduction in size and diameter can be achieved when the outer circumferential surfaces of the permanent magnets are shaped into a tilting surface or rounded off.

Both the polarizer and the analyzer are shaped into the form of a rectangular flat plate so that the polarization axes thereof are oriented at 45 degrees to each other. When the polarizer and the analyzer are bonded on the longer side to the permanent magnet, the isolator characteristic manifests itself without any adjustment. This eliminates the need for man-hours/parts that have been necessary for the adjustment, thus allowing manufacturing at low cost. The central through hole of the holder has a shape into which a capillary portion of a ferrule can fit. When the end faces of the holder and the ferrule are abutted and fastened with the capillary portion fitted into the central through hole, the bonding strength of the optical isolator to the end of the ferrule can be further enhanced.

Although the preferred embodiment of the present invention has been described in detail hereinabove, it should be understood that various changes, permutations and alterations thereof are possible without departing from the spirit and scope of the present invention as defined in the appended claims.

What is claimed is:

1. An optical isolator comprising a combination of an optical isolator main body and a holder holding the optical isolator main body, the optical isolator main body including a Faraday rotator element, a polarizer and an analyzer disposed at the front and back of the Faraday rotator element, and permanent magnets disposed on the outside of the Faraday rotator element, the polarizer and the analyzer, wherein the optical isolator main body has a pair of the permanent magnets in the shape of elongated flat plates opposed to each other with a space therebetween, and the Faraday rotator element, the polarizer and the analyzer disposed between the pair of permanent magnets, wherein the holder has a concave groove formed on one side of a cylindrical portion having a central through hole, and wherein the optical isolator main body is inserted and fastened in the concave groove of the holder with the outer surfaces of the permanent magnets exposed such that the holder can be attached to a ferrule at the end face on the opposite side of the concave groove.

2. An optical isolator of claim 1, wherein the holder is in a cylindrical form such that when the optical isolator main body is inserted in the concave groove of the holder, the outer surfaces of the permanent magnets of the optical isolator main body are substantially in alignment with the outer circumferential shape of the holder.

3. An optical isolator of claim 1, wherein the polarizer and the analyzer are shaped into rectangular flat plates such that the optic axes thereof are oriented at 45 degrees to each other, wherein the polarizer and the analyzer are fastened to the permanent magnet on the side surface of the longer side, and wherein the isolator characteristic manifests itself without any adjustment as a result of the shaping and fastening.

4. An optical isolator of claim 1, wherein the central through hole of the holder has a shape into which a capillary portion of the ferrule fits, and wherein the end faces of the holder and the ferrule are abutted against and fastened to each other with the capillary portion fitted into the central through hole.

5. An optical isolator manufacturing method comprising:

providing a pair of permanent magnets in the shape of elongated flat plates;

arranging a Faraday rotator element on one of the pair of permanent magnets so as to cut across the longitudinal direction thereof;

arranging a polarizer and an analyzer on the other of the pair of permanent magnets so as to cut across the longitudinal direction thereof with a given space between the polarizer and the analyzer; and securely installing the pair of permanent magnets to oppose each other such that the polarizer, the Faraday rotator element and the analyzer are arranged in this order along the optical axis in a concave groove of a substantially cylindrical holder, the holder having one end portion formed with the concave groove and the other end portion adapted to be attached to a ferrule.

6. An optical isolator manufacturing method of claim 5, comprising:

first inserting and fastening in the concave groove of the holder either the permanent magnet having the Faraday rotator element disposed thereon or the permanent magnet having the polarizer and the analyzer disposed thereon; and then securely installing the other permanent magnet such that the pair of permanent magnets oppose each other and that the polarizer, the Faraday rotator element and the analyzer are arranged in this order along the optical axis.

* * * * *